(12) United States Patent
Piciaccia et al.

(10) Patent No.: US 7,808,623 B2
(45) Date of Patent: Oct. 5, 2010

(54) MEASUREMENT OF OPTICAL FIBER LENGTH AND DETERMINATION OF CHROMATIC DISPERSION OVER THE OPTICAL FIBER

(75) Inventors: Stefano Piciaccia, Milan (IT); Fabrizio Forghieri, Monza (IT); Ornan Gerstel, Los Altos, CA (US); Gabriele Maria Galimberti, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 270 days.

(21) Appl. No.: 11/872,656

(22) Filed: Oct. 15, 2007

(65) Prior Publication Data

US 2009/0097014 A1    Apr. 16, 2009

(51) Int. Cl.
   *G01N 21/00* (2006.01)
(52) U.S. Cl. ...................................... 356/73.1
(58) Field of Classification Search ........................ None
    See application file for complete search history.

(56) References Cited

U.S. PATENT DOCUMENTS

| 5,801,818 | A * | 9/1998 | Corrigan et al. ............ 356/5.01 |
| 2007/0258721 | A1* | 11/2007 | Boduch et al. .............. 398/147 |

* cited by examiner

*Primary Examiner*—Tu T Nguyen
(74) *Attorney, Agent, or Firm*—Brake Hughes Bellermann LLP

(57) ABSTRACT

In one embodiment, first optical signal can be generated at a first end of an optical fiber segment at a first time. The first optical signal can be detected at a second end of the optical fiber segment at a second time. A second optical signal can be generated at a second end of the optical fiber segment at a third time in response to the detection of the first optical signal. The second optical signal can be detected at the first end of the optical fiber segment at a fourth time. A length of the optical fiber segment can be determined based on a difference between the second time and the first time, a difference between the third time and the second time, and a difference between the fourth time and the third time.

16 Claims, 4 Drawing Sheets

MEASUREMENT OF OPTICAL FIBER LENGTH AND DETERMINATION OF CHROMATIC DISPERSION OVER THE OPTICAL FIBER

TECHNICAL FIELD

The present disclosure relates generally to telecommunications, and in particular to measuring an optical fiber length and determining a chromatic dispersion over the optical fiber.

BACKGROUND

Telecommunications technology can use optical signals to communicate information from one location to another. In particular, optical signals can be communicated over optical fibers that connect one location to another. One particular protocol used in optical communications technology is wavelength division multiplexing (WDM), which permits the concurrent transmission of multiple information channels over a common optical fiber, thus expanding available bandwidth of information that can be transmitted over the fiber. Optimally exploiting the capabilities of optical communication, including WDM technology, requires dealing with various transmission impairments. In particular, attenuation and chromatic dispersion of optical signals occur as the signals propagate through a length of optical fiber. Eventually, after optical signals have propagated over a long distance through an optical fiber and have suffered a certain amount of attenuation and/or chromatic dispersion, the signals must be amplified and/or regenerated so that the information carried by the optical signals can continue to propagate through the fiber.

Erbium-doped fiber amplifiers (EDFAs) can be used to amplify an optical signal having a wavelength of about 1525-1565 nanometers (nm), which propagates in an optical fiber. Because an EDFA provides gain over a relatively wide of wavelengths, and EDFA can provide simultaneous amplification of all wavelengths in a composite WDM signal. Using this type of amplification, the WDM composite signal may be transmitted large distances, e.g., more than 600 km, without regeneration.

Another type of optical communication impairment is chromatic dispersion, which leads to a widening of an optical pulse as the pulse propagates along the fiber and is caused by different spectral components of the pulse propagating through the fiber at different velocities. Because of chromatic dispersion, the modulation of optical pulses that encode data spread out in the time domain as the pulses propagate along the fiber and can start to overlap overlapping one another, which can lead to bit errors. Generally, the amount of chromatic dispersion suffered by an optical signal depends on the characteristics of the fiber and the length of the fiber span over which the signal propagates.

The amount of chromatic dispersion suffered by an optical signal that travels over a fixed length of optical fiber can be compensated by inserting a tunable dispersion compensation unit into the transmission path. The dispersion compensation unit deliberately introduces a chromatic dispersion that is opposite in sign to the dispersion caused by transmission of the signal through the fiber and therefore effectively cancels out the dispersion caused by the optical fiber. In order to tune the dispersion compensation unit to provide a negative amount of chromatic dispersion equal in magnitude to the positive dispersion caused by transmission through the optical fiber the amount of dispersion accrued while the signal propagates through the optical fiber must be known.

DESCRIPTION OF EXAMPLE EMBODIMENTS

Overview

A first optical signal can be generated at a first end of an optical fiber segment at a first time. The first optical signal can be detected at a second end of the optical fiber segment at a second time. A second optical signal can be generated at a second end of the optical fiber segment at a third time in response to the detection of the first optical signal. The second optical signal can be detected at the first end of the optical fiber segment at a fourth time. A length of the optical fiber segment can be determined based on a difference between the second time and the first time, a difference between the third time and the second time, and a difference between the fourth time and the third time.

Figure 1:
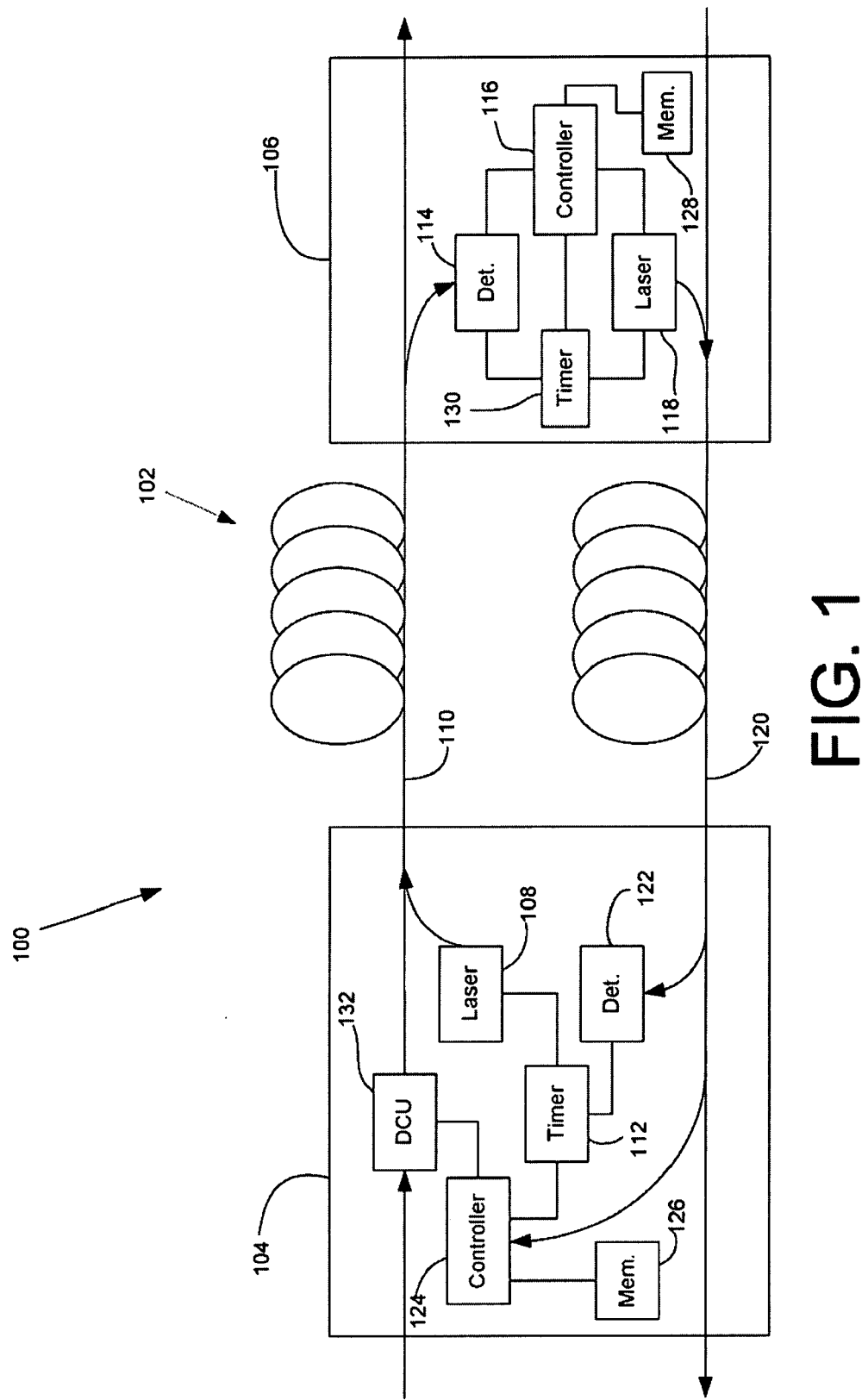
FIG. 1 is a schematic block diagram of a system for determining a length of an optical fiber segment.

FIG. 1 is a schematic block diagram of a system 100 for determining a length of an optical fiber segment. The optical fiber segment 102 can be a portion of an optical fiber between a first end station 104 of a transmission path and a second end station 106 of the transmission path. The segment 102 can be several kilometers, tens of kilometers or hundreds of kilometers long. The optical fiber segment 102 can be a portion of a transmission path that carries optical data signals from a transmission station to a receiving station. Thus, the first end station 104 of the transmission path can receive an optical data signal that originated at the transmission station and can forward the data signal over the optical fiber segment 102 to the second end station 106, from which the data signal is forwarded to the receiving station. The optical fiber segment 102 can have material and performance characteristics that are optimized for carrying optical signals over long distances. For example, the optical fiber segment 102 can have a minimum attenuation as a function of wavelength for optical signals having a wavelength of about 1550 nm, and therefore optical data signals having a wavelength of about 1550 nm may be used to send long haul data communications over the optical fiber segment.

A laser 108 located at the first end station 104 of the fiber segment 102 can generate an optical signal (e.g., a first optical pulse) that is launched into an optical fiber 110 and that can be transmitted through the optical fiber 110 to the second end station 106. The laser 108 can generate optical signals having a wavelength that is transmitted with low attenuation over the fiber segment 102 (e.g., close to 1550 nm), but the wavelength may also be chosen to be outside the gain bandwidth of a typical EDFA that may be used at either end of the segment, so that signal from the laser is not amplified and transmitted past the second end station 106. In certain implementations, the optical signal generated by the laser 108 can have a wavelength of about 1510 or 1600 nm. In other implementations, the laser 108 may generate an optical signal having a wavelength of about 1300 nm, such that the signal is transmitted over the optical fiber 110 with very little dispersion.

The laser 108 can be coupled to a timer 112, so that at the time the first optical pulse is generated and launched into the optical fiber 110 the timer 112 is started. The timer 110 can measure the time, τ, between the time at which the first optical pulse from the laser 108 is launched into the fiber 110 and a time at which a return pulse is received from the second end station 106.

After the optical pulse travels over the optical fiber 110 and reaches the second end 106, a detector 114 at the second end of the optical fiber segment can detect the pulse. The detector 114 can generate an electrical signal in response to receiving the first optical pulse from the first end and can transmit the electrical signal to a controller 116, which, in turn, can trigger a second laser 118 at the second end of the optical fiber segment to generate another optical signal (e.g., a second optical pulse) that is launched into an optical fiber 120 and transmitted through the optical fiber to the first end station 104. The second optical signal can be received by a detector 122 located at the first end station 104, and when the detector receives the optical signal it can send an electrical signal to the timer 112, which causes the timer to stop. Thus, the timer 112 can measure the round-trip time, τ, of sending an optical signal to the second end station 106 and receiving a return signal from the second end station. The timer can feed this information to a controller 124 in the first end station. Because a second optical pulse is generated at the second end station 106 and transmitted back to the first end station 104 to determine the round-trip time, τ, as opposed to relying on light reflected from the second end station, a relatively low power pulse can be transmitted from the first end station 104 to the second ends station 106 and still trigger the generation of a second pulse that can be detected by the detector 122 in the first end station. In addition, a relatively inexpensive detector 122 (e.g., a relatively inexpensive photodetector) can be used to detect the second optical signal rather than requiring a special and expensive optical detection system to detect weak signals that are reflected from the second end station.

Then, if the time delay, t, between the time at which the first optical pulse is detected by the detector 114 and the time at which the second optical pulse is transmitted by the laser 118 is known the length, L, of the optical fiber segment 102 between the two end stations can be determined by controller 124 according to the following equation:

$$L = \frac{(c/n)(\tau - t)}{2} \quad (1)$$

where (c/n) is the speed of light in the fibers 110 and 120.

The speed of light within the fiber, c, used in equation (1) can be predetermined based on known characteristics or measured properties of the fibers 110 and 120 that make up the optical fiber segment 102. The value of c can be stored in a memory 126 coupled to the controller 124 in the first end station and then retrieved by the controller 124 for calculating the length, L, according to equation (1).

The delay time, t, required for the second end station 106 to receive the first optical pulse and generate the second optical pulse for transmission back to the first end station 104 can be determined in a number of different ways. In one implementation, the delay time, t, can be pre-determined based on design parameters of the second end station (e.g., a response time of the detector, a response time of the controller, and a response time of the electronics for modulating the laser 118), and this pre-determined delay time can be stored in the memory 126 coupled to the controller 124 in the first end station and then retrieved by the controller for calculating the length, L, according to equation (1). In another implementation, the value of the delay time, t, can be stored in a memory 128 within the second end 106 station and then communicated (e.g., over the optical fiber segment 102) to the controller 124 in the first end station 104 for use by the controller 124 in calculating the length, L. In another implementation, the delay time, t, can be measured, for example, by starting a timer 130 when an optical pulse is received at the detector 114 and stopping the timer when the laser 118 generates an optical pulse to send out from the end station 106. The value of the delay time, t, measured by the timer 130 can be stored in the memory 128 for later use in calculating the length of the optical fiber segment 102. The measurement of the delay time, t, can be performed after the end station 106 is constructed (e.g., at the manufacturing site), and the measured value can be stored for later use, or the delay time can be measured at the time that the round-trip time, τ, is measured.

Although, the controller 124 in the first end station (i.e., the end station that sends the first optical pulse and receives a response optical pulse) has been described as the controller that performs the length calculation according to equation (1), the controller 116 in the second end station also can perform the length calculation based on the parameters shown in equation (1) if the information about the round-trip time, τ, is communicated from the first send station 104 to the second end station 106. Additionally, although the optical fiber segment 102 between the end stations has been described as including a first optical fiber 110 for transmitting the first optical pulse and a second optical fiber 120 for transmitting the second optical pulse, the segment may include more than two optical fibers, or may include a single optical fiber that transmits optical pulses in both directions.

After the length, L, of the optical fiber segment 102 is determined, the amount of dispersion suffered by optical signals transmitted over the segment can be determined and then compensated for by appropriately configuring a dispersion compensating unit (DCU) 132 in the transmission path between the first end station 104 and the second end station 106. The DCU module can be located either before or after the fiber span for which it compensates dispersion. The amount of dispersion suffered by an optical signal transmitted over the segment depends on the optical properties of the fiber, the wavelength of the light in the optical signal, and the length of the fiber. Parameters characterizing the properties of the optical fiber (e.g., the amount of dispersion, as measured, for example, in picoseconds per nanometer per kilometer traveled) can be stored in the memory 126 and retrieved by the controller 124 to determine the total dispersion over the length of the optical fiber segment for a signal having a particular wavelength.

Once the amount of dispersion accrued during transmission over the optical fiber segment 102 is known, this unwanted dispersion can be compensated for. For example, a tunable DCU 132 can be configured to provide an equal but opposite amount of dispersion than is caused by transmission through the fiber. The DCU can include a number of lengths of optical fibers having negative dispersions when compared to the dispersion caused by the optical fiber 110 or 120 causes a dispersion. Then, the optical signal carrying data from the first end station 104 to the second end station 106 can be passed through a length of optical fiber in the DCU 132 having the an appropriate length (and hence and appropriate total negative dispersion) to compensate for the positive dispersion that is known to be caused by the transmission through the length, L, of the fiber segment 102.

The processes of determining the length of the optical fiber segment 102 based on a measured time interval between sending a signal from laser 108 and receiving a response pulse at detector 122, and on a known or measured time interval between receiving an optical signal at detector 114 and sending the response signal from laser 118, determining a dispersion caused by transmission over the optical fiber segment 102 based on the length of the segment and known properties of the optical fiber, and configuring a DCU 132 to provide an appropriate amount of negative dispersion to compensate for the dispersion in the segment 102 can be performed automatically, such that the an optical link between the first and second end stations can be configured automatically to be relatively free of dispersion.

Figure 2:
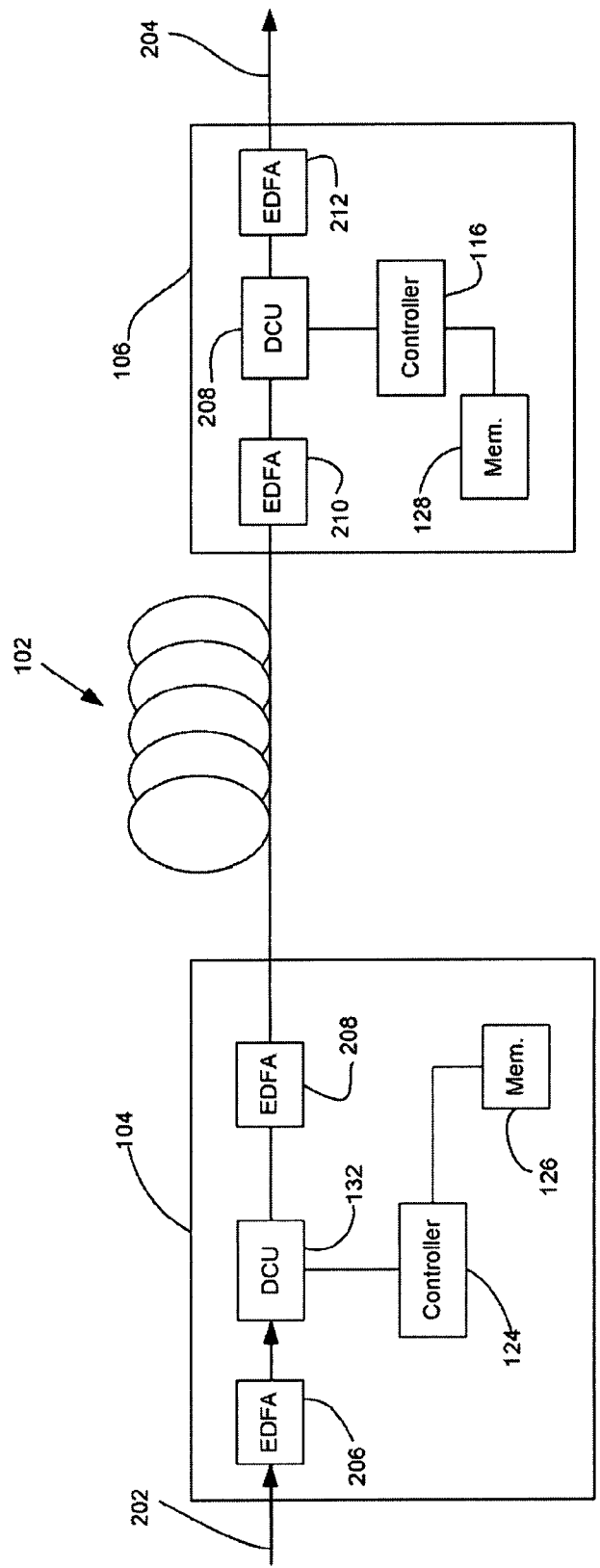
FIG. 2 is a schematic block diagram of a system for transmitting an optical dispersion-compensated signal over the optical fiber segment.

FIG. 2 is a schematic block diagram of a system for transmitting an optical dispersion-compensated signal over a transmission path that includes an optical fiber segment 102 between the first end station 104 and the second end station 106. The first end station 104 can receive optical data signals transmitted over an optical fiber 202 from a previous transmitter in the transmission path, and the second end station 106 can transmit the optical data signals to a repeater located downstream in the transmission path. The first end station 104 can include an EDFA 206 inserted in the transmission path before the DCU 132 and an EDFA 208 in the transmission path after the DCU 132, where the EDFAs are used to amplify the signals received over the optical fiber 202 before transmitting the signals over the optical fiber segment 102 to the second end station 106. The second end station 106 also can include a DCU 208 located between a first EDFA 210 and a second EDFA 212, where the EDFAs are used to amplify the signals received over the optical fiber segment 102 before transmitting the signals over the optical fiber 204 to a downstream repeater.

One of the DCUs 132 or 208 can be configured to provide an appropriate amount of negative dispersion to compensate for the positive dispersion accrued when a data optical signal is transmitted over the optical fiber segment 102. If the DCU 132 provides dispersion compensation for the dispersion caused by the optical fiber segment 102, then the DCU 208 can provide dispersion compensation for the dispersion caused by transmission over the optical fiber 204 between the second end station 106 and a downstream repeater. If the DCU 208 provides dispersion compensation for the dispersion caused by the optical fiber segment 102, then the DCU 132 can provide dispersion compensation for the dispersion caused by transmission over the optical fiber 202 between the first end station 104 and an upstream repeater. In this manner, dispersion over each link within the transmission path can be appropriately compensated.

Figure 3:
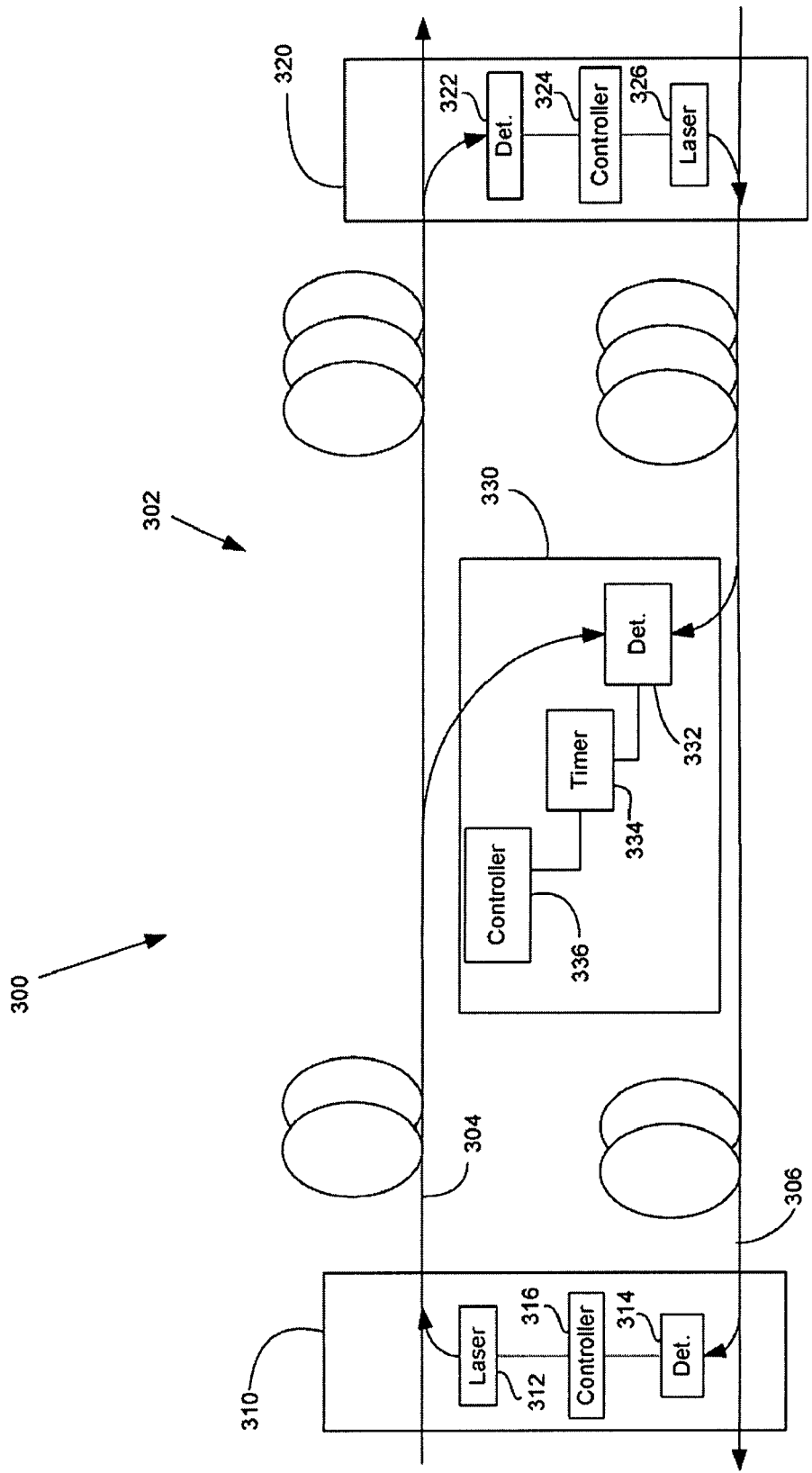
FIG. 3 is a schematic block diagram of another system for determining a length of an optical fiber segment.

FIG. 3 is a schematic block diagram of another implementation of a system 300 for determining a length of an optical fiber segment 302. In the system shown in FIG. 3, a first end station 310 can include a laser 312 that generates first optical pulse (e.g., at a first time) that is launched into a first optical fiber 304 of the optical fiber segment. A second end station 320 can include a detector 322 that detects the first optical pulse (e.g., at a second time). In response to a signal from the detector 322, a controller 324 can trigger a laser 326 in the second end station 320 to generate a second optical pulse that is launched into a second optical fiber 306 of the optical fiber segment (e.g., at a third time). The second optical pulse can be detected by a detector 314 in the first station 310 (e.g., at a fourth time). In response to a signal from the detector 314, a controller 316 can trigger the laser 312 in the first end station 310 to generate a third optical pulse that is launched into the first optical fiber 304 of the optical fiber segment 302 (e.g., at a fifth time). An intermediate station 330 that includes a detector 332 that detects the first, second, and third optical pulses when they arrive at the intermediate station (e.g., at sixth, seventh, and eighth times, respectively), a timer 334, and a controller 336 can be used to determine the length of the optical fiber segment 302 between the first end station 310 and the second end station 320 based on the times at which the detector 332 receives the first, second, and third optical pulses. For example, the length, $L_1$, of the optical fiber segment between the intermediate station 330 and the second end station 320 can be determined by the difference between the arrival time of the second optical pulse and the first optical pulse, $\tau_1$, at the intermediate station and the delay time, $t_1$, required for the second end station 320 to receive the first optical pulse and to generate the second optical pulse according to the equation:

$$L_1 = \frac{(c/n)(\tau_1 - t_1)}{2}. \tag{2}$$

The length, $L_2$, of the optical fiber segment between the intermediate station 330 and the first end station 310 can be determined by the difference between the arrival time of the second optical pulse and the third optical pulse, $\tau_2$, at the intermediate station and the delay time, $t_2$, required for the first end station 310 to receive the second optical pulse and to generate the third optical pulse according to the equation:

$$L_2 = \frac{(c/n)(\tau_2 - t_2)}{2}. \tag{3}$$

Thus, the length of the optical fiber segment 302 between the first end station 310 and the second end station 320 is $L_1 + L_2$. A controller 316, 324, or 336 can then configure a DCU located within the optical fiber segment 302 (e.g., in the first end station 310, in the second end station 320, or in the intermediate station 330) based on known dispersion characteristics of the optical fiber segment and the calculated length of the segment to compensate for chromatic dispersion that occurs when an optical signal propagates along the segment 302.

Figure 4:
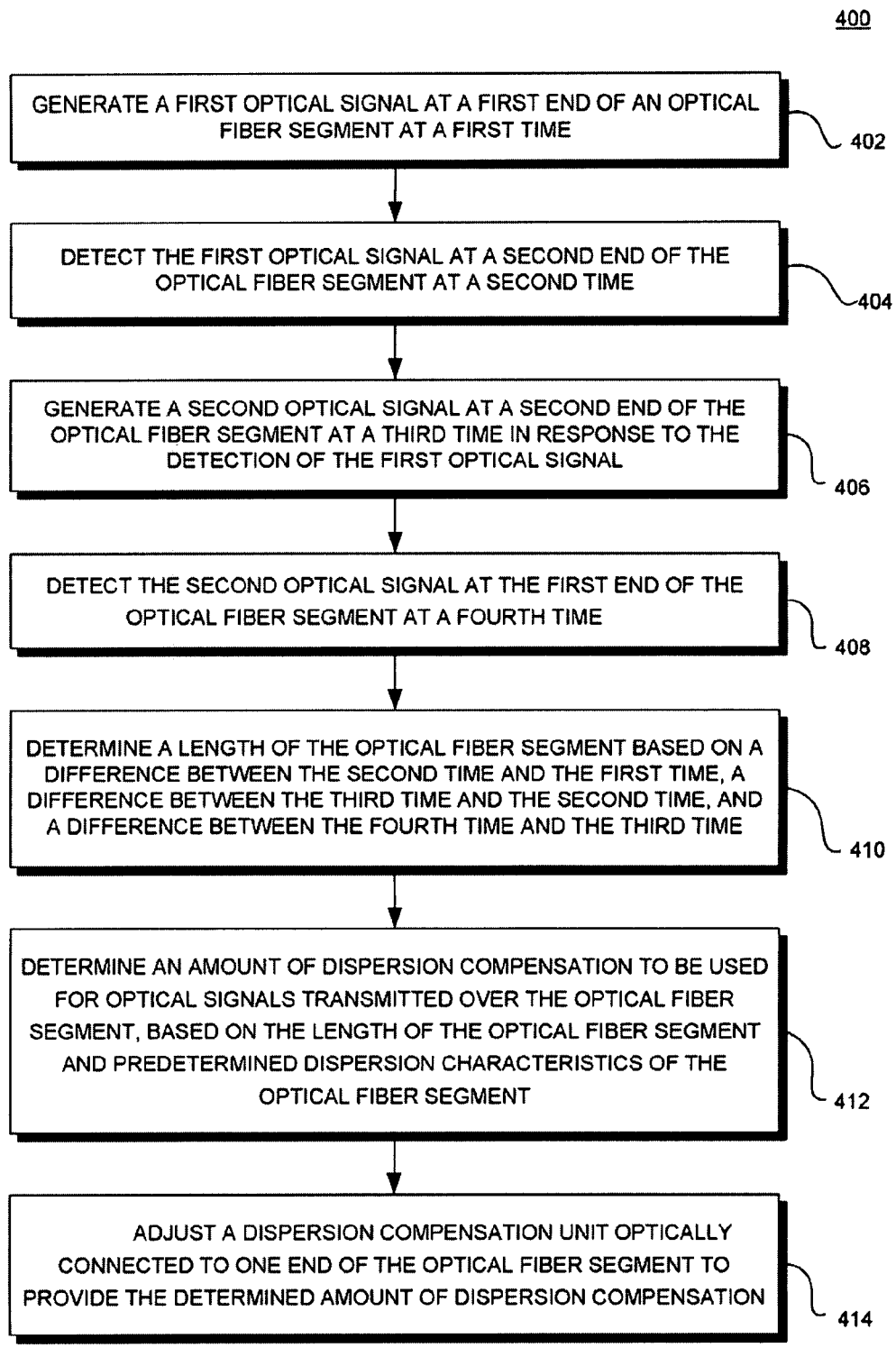
FIG. 4 is a flow chart illustrating a process for determining a length of an optical fiber segment, and an amount of chromatic dispersion that occurs during optical signal transmission over the segment.

FIG. 4 is a flow chart illustrating a process 400 for determining a length of an optical fiber segment, and adding an amount of dispersion compensation to the optical fiber segment. In the process, a first optical signal is generated at a first end of an optical fiber segment at a first time (step 402). For example the first optical signal can be generated by the laser 108 of the first end station 104 and launched into the optical fiber 110 of the optical fiber segment 102. The first optical signal is detected at a second end of the optical fiber segment at a second time (step 404). For example, the first optical signal can be detected by the detector 114 in the second end station 106. A second optical signal is generated at a second end of the optical fiber segment at a third time in response to the detection of the first optical signal (step 406). For example, the second optical signal can be generated by the laser 118 of the second end station and launched into the fiber 120 in response to the detector 114 providing an indication that it has detected the first optical signal. The second optical signal is detected at the first end of the optical fiber segment at a fourth time (step 408). For example, the second optical signal can be detected by the detector 122 at the first end station.

Then, the length of the optical fiber segment is determined based on a difference between the second time and the first time, a difference between the third time and the second time, and a difference between the fourth time and the third time (step 410). Determining these time differences is straightforward, as discussed above. For example, the difference between the third time and the second time, t, can be determined when the second end station is designed or manufactured and stored in the memory 128, or the difference between the third time and the second time can be measured by timer 130. The value of the difference between the third time and the second time, t, can be communicated from the second end station to the first end station for the controller 124 to use in determining the length of the optical fiber segment. The difference between second time and the first time and the difference between the fourth time and the third time can be determined based on the round-trip time, τ, measured by the timer 112 in the first end station, and value of the delay time, t (i.e., difference between the third time and the second time). For example, the difference between the second time and the first time and the difference between the fourth time and the third time each can be half the difference between the round-trip time and the delay time, i.e., (τ−t) /2. Thus, the length of the optical fiber segment can be determined according to equation (1), as explained above.

After the length of the optical fiber segment has been determined, an amount of dispersion compensation to be used for optical signals transmitted over the optical fiber segment can be determined (step 412). The determination is based on the length of the optical fiber segment and the predetermined dispersion characteristics of the optical fiber segment. For example, if the length of the optical fiber segment is determined to be 100 km, and optical signals having a wavelength of 1550 nm are known to experience a dispersion of 17 ps/nm/km when transmitted over the type of fiber used in the segment between the first and second end station, then the total dispersion suffered by an optical signal transmitted over the segment is 1700 ps/nm. A dispersion compensation unit optically connected to one end of the optical fiber segment then can be adjusted to provide the determined amount of dispersion compensation (step 414). For example, the controller 124 can configure the DCU 132 in the first end station 104 or the controller 116 can configure the DCU 208 in the second end station to provide the determined amount of dispersion compensation.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

While certain features of the described implementations have been illustrated as described herein, many modifications, substitutions, changes and equivalents will now occur to those skilled in the art.

What is claimed is:

1. A method comprising:
    generating a first optical signal at a first end of an optical fiber segment at a first time;
    detecting the first optical signal at a second end of the optical fiber segment at a second time;
    generating a second optical signal at a second end of the optical fiber segment at a third time in response to the detection of the first optical signal;
    detecting the second optical signal at the first end of the optical fiber segment at a fourth time;
    generating a third optical signal at the first end of the optical fiber segment at a fifth time in response to the detection of the second optical signal;
    detecting the first optical signal at a location along the optical fiber segment between the first end and the second end at a sixth time;
    detecting the second optical signal at the location along the optical fiber segment between the first end and the second end at a seventh time;
    detecting the third optical signal at the location along the optical fiber segment between the first end and the second end at an eighth time; and
    determining a length of the optical fiber segment based on a difference between the third time and the second time, a difference between the fifth time and the fourth time, a difference between the seventh time and the sixth time, and a difference between the eighth time and the seventh time.

2. The method of claim 1, further comprising:
    launching the first optical signal into a first optical fiber; and
    launching the second optical signal into a second optical fiber.

3. The method of claim 1, further comprising:
    generating an electrical signal in response to the detection of the first optical signal;
    detecting the electrical signal; and
    generating the second optical signal in response to detection of the electrical signal.

4. The method of claim 1, further comprising:
determining an amount of dispersion compensation to be used for optical signals transmitted over the optical fiber segment,
wherein the determination is based on the length of the optical fiber segment and predetermined dispersion characteristics of the optical fiber segment.

5. The method of claim 4, further comprising
adjusting a dispersion compensation unit optically connected to the optical fiber segment at the location along the optical fiber segment between the first end and the second end to provide the determined amount of dispersion compensation.

6. The method of claim 1, further comprising:
starting a timer at the first time; and
stopping the timer at the fourth time.

7. The method of claim 1, further comprising receiving data about the difference between the third time and the second time.

8. The method of claim 1, further comprising:
starting a timer at the second time;
stopping the timer at the third time; and
transmitting information about the difference between the third time and the second time from the second end of the optical fiber second to the first end of the optical fiber segment.

9. The method of claim 1, wherein the length of the optical fiber segment is greater than about 10 kilometers.

10. A system comprising:
an optical fiber segment having a first end and a second end;
a first light source optically coupled to the optical fiber segment and adapted to generate a first optical signal at the first end of the optical fiber segment at a first time;
a first detector optically coupled to the second end of the optical fiber segment and adapted to detect the first optical signal at the second end of the optical fiber segment at a second time;
a second light source optically coupled to the optical fiber segment and adapted to generate a second optical signal at the second end of the optical fiber segment at a third time;
a second detector optically coupled to the first end of the optical fiber segment and adapted to detect the second optical signal at the first end of the optical fiber segment at a fourth time and to trigger the first light source to generate a third optical signal at the first end of the optical fiber at a fifth time;
a third detector coupled to the optical fiber segment at a location along the segment between the first end and the second end and configured to detect the first optical signal at a sixth time, to detect the second optical signal at a seventh time, and to detect the third optical signal at an eighth time; and
a controller adapted to determine a length of the optical fiber segment based on a difference between the third time and the second time, a difference between the fifth time and the fourth time, a difference between the seventh time and the sixth time, and a difference between the eighth time and the seventh time.

11. The system of claim 10, wherein the optical fiber segment comprises:
a first optical fiber adapted to transmit the first optical signal from the first end to the second end; and
a second optical fiber adapted to transmit the second optical signal from the second end to the first end.

12. The system of claim 10, further comprising:
an optical-to-electrical converter adapted to generate an electrical signal in response to the detection of the first optical signal; and
an electrical-to-optical converter adapted to generate the second optical signal in response to detection of the electrical signal.

13. The system of claim 10, wherein the controller is further adapted to determine an amount of dispersion compensation to be used for optical signals transmitted over the optical fiber segment based on the length of the optical fiber segment and predetermined dispersion characteristics of the optical fiber segment.

14. The system of claim 13, further comprising
a tunable dispersion compensation unit optically coupled to the optical fiber segment at a location along segment between the first end and the second end.

15. The system of claim 10, wherein the length of the optical fiber segment is greater than about 10 kilometers.

16. The system of claim 15, wherein the length of the optical fiber segment is greater than 100 km.

* * * * *

UNITED STATES PATENT AND TRADEMARK OFFICE
CERTIFICATE OF CORRECTION

| | | |
|---|---|---|
| PATENT NO. | : 7,808,623 B2 | Page 1 of 1 |
| APPLICATION NO. | : 11/872656 | |
| DATED | : October 5, 2010 | |
| INVENTOR(S) | : Stefano Piciaccia et al. | |

It is certified that error appears in the above-identified patent and that said Letters Patent is hereby corrected as shown below:

In column 9, line 8, in claim 5, after "comprising" insert -- : --.

In column 9, line 25, in claim 8, delete "second to" and insert -- segment to --, therefor.

In column 10, line 36, in claim 14, after "comprising" insert -- : --.

Signed and Sealed this
Fifteenth Day of February, 2011

David J. Kappos
*Director of the United States Patent and Trademark Office*